July 24, 1923.
H. C. SCHAPER
COMBINATION BAG RACK AND AUXILIARY PLATFORM FOR SCALES
Filed Sept. 13, 1920    2 Sheets-Sheet 2
1,462,983
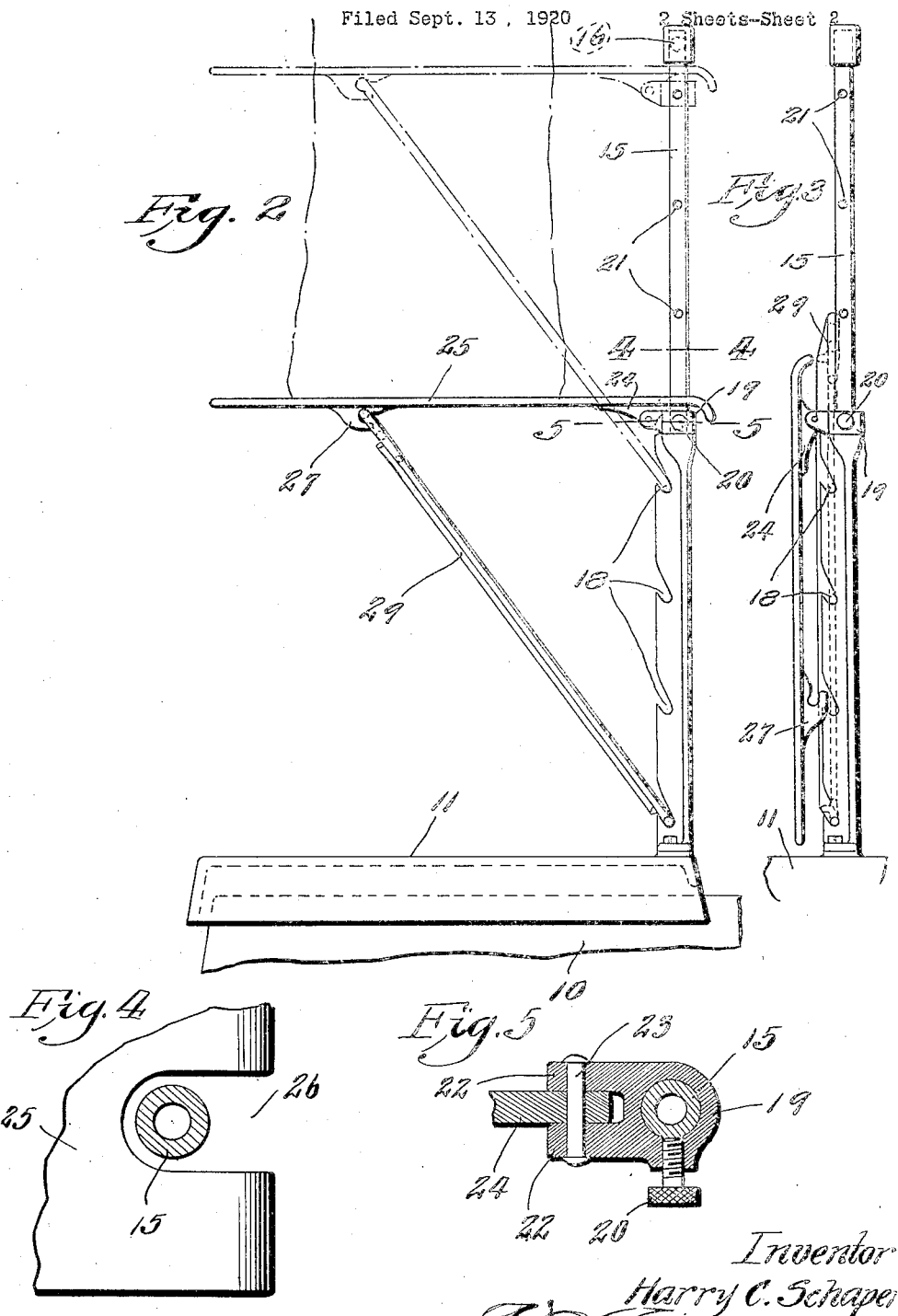
Inventor
Harry C. Schaper Patented July 24, 1923.

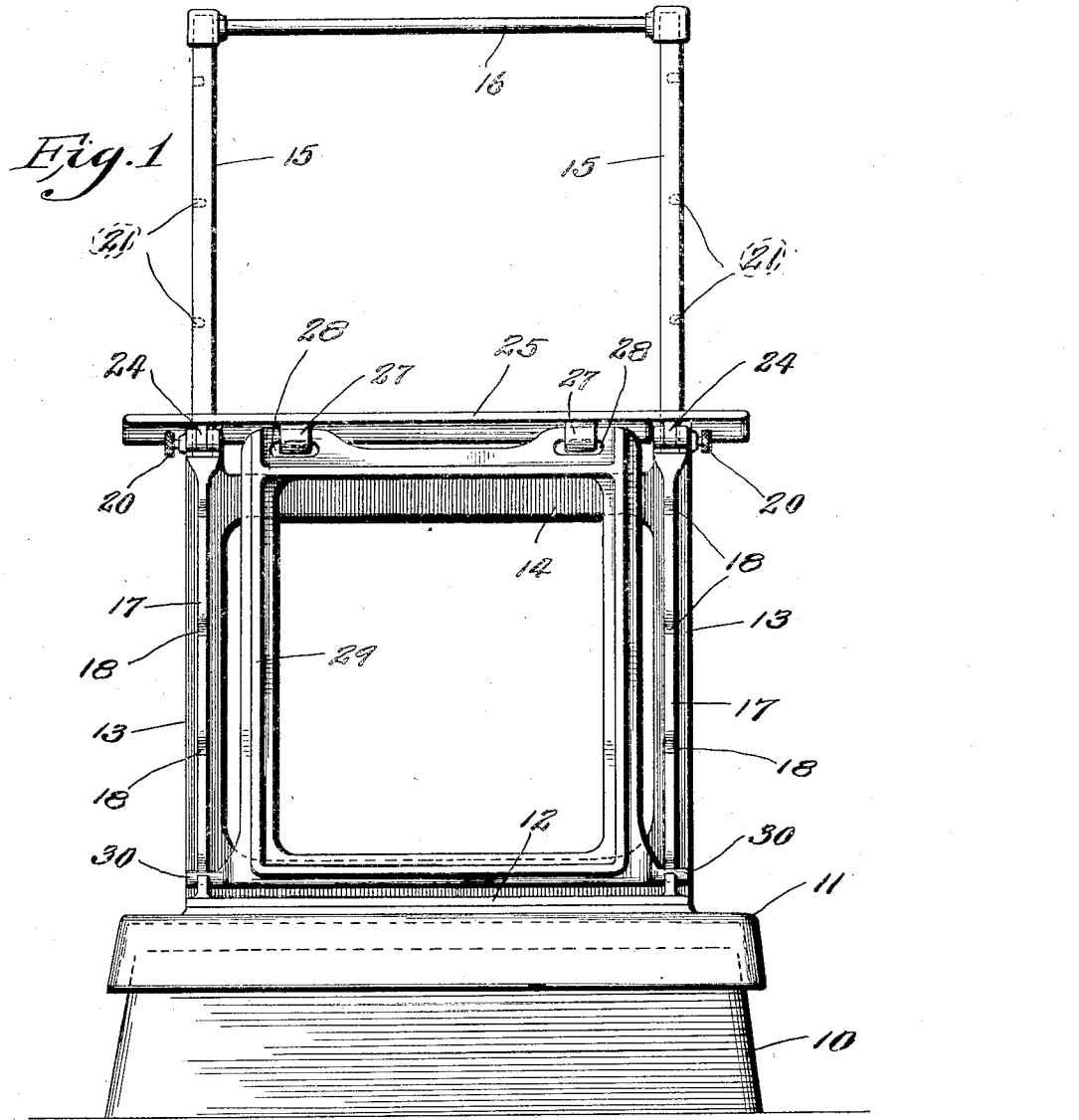

1,462,983

UNITED STATES PATENT OFFICE.

HARRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

COMBINATION BAG RACK AND AUXILIARY PLATFORM FOR SCALES.

Application filed September 13, 1920. Serial No. 410,047.

*To all whom it may concern:*

Be it known that I, HARRY C. SCHAPER, a citizen of the United States, residing at St. Louis, Missouri, have invented a certain new and useful Improvement in Combination Bag Racks and Auxiliary Platforms for Scales, of which the following is a full, clear, and exact description, such as will enable others skilled in the art to which it appertains to make and use the same, reference being had to the accompanying drawings, forming part of this specification.

My invention relates generally to weighing scales and more particularly to a frame or structure that is positioned upon the platform of the scale, and which structure includes an auxiliary platform that is adapted to be arranged at different heights above the main platform of the scale, and which arrangement is of especial advantage in facilitating the work incident to the weighing of small objects or packages and which ordinarily require the workman to bend over when the objects or packages are placed upon or removed from the scale platform.

The principal object of my invention is to provide a relatively simple and efficient structure which includes an auxiliary platform that can be easily and quickly raised or lowered for the accommodation of the goods or objects that are being weighed and said auxiliary platform being hinged to its supporting framework so that it can be swung or folded into an out-of-the-way position when it is desired to use the scale for weighing relatively tall objects or those objects or packages which do not require the weighman to bend over in placing them upon and removing them from the scale platform.

A further object of my invention is to equip a scale platform with an upright frame or rack which serves as a support for a filled or partially filled bag while the same is positioned on the scale platform to be filled and weighed. In this connection it will be understood that there is a tendency of a filled bag of granular material such as cement, lime, or small grain, to topple over when placed on the scale platform, and my improved device serves to hold the bags firmly in an upright position while on the platform.

With the foregoing and other objects in view, my invention consists in certain novel features of construction and arrangement of parts hereinafter more fully described and claimed, and illustrated in the accompanying drawings, in which—

Figure 1 is a front elevational view of an auxiliary scale platform of my improved construction.

Figure 2 is a side elevational view of the auxiliary platform with dotted lines showing the same in elevated position.

Figure 3 is a side elevational view of the auxiliary platform and the supporting framework therefor and showing said platform swung downward into an out-of-the-way position.

Figure 4 is an enlarged horizontal section taken approximately on the line 4—4 of Figure 2.

Figure 5 is an enlarged horizontal section taken approximately on the line 5—5 of Figure 2.

Referring by numerals to the accompanying drawings which illustrate a practical embodiment of my invention, 10 designates the base frame or housing of an ordinary weighing scale, and disposed above said base is the usual load receiving platform 11. The support for the auxiliary platform contemplated by my invention comprises a substantially rectangular frame, preferably formed of cast metal and including a horizontally disposed base rail 12, a pair of uprights 13, and a top rail 14. The base rail 12 is fixed in any suitable manner, preferably by means of bolts, to one end of the scale platform 11, and rigidly fixed to and projecting upwardly from the upper ends of the uprights 13 are posts or standards 15, preferably in the form of metal rods or tubes. Connecting the upper ends of these posts or uprights is a horizontally disposed brace rail 16.

Formed integral with the upright members 13 are vertically disposed webs 17 and formed therein at suitable distances apart are notches 18. Arranged to slide freely on the uprights or posts 15 are collars 19 through the walls of which pass the threaded shanks of thumb screws 20 and the inner ends of said shanks are adapted to engage in suitably located apertures or recesses 21, the same being suitably spaced apart and the distance between an adjacent pair of these apertures corresponds with the distance between an adjacent pair of the notches 18. Formed integral with the collars 19 are horizontally disposed pairs of ears 22 and hinged thereto by means of transversely disposed pins 23 are ears 24 that are fixed to and depend from the rear portion of a substantially rectangular plate 25, preferably formed of metal and which constitutes the vertically adjustable auxiliary platform for the scale. The rear or inner edge of this auxiliary platform extends a short distance beyond the posts or uprights and said platform being notched or cut away as designated by 26 for the accommodation of said posts or uprights.

Formed integral with or fixed to the underside of the front portion of this auxiliary platform are depending rearwardly presented hooks 27 that are adapted to engage in slots or apertures 28 which latter are formed in the upper rail of a substantially rectangular skeleton brace or auxiliary platform supporting member 29. Formed at the lower corners of this brace member are laterally projecting pins 30 that are adapted to engage in the notches 18 that are formed in the webs 17 of the upright supporting frame.

To adjust the auxiliary platform vertically, thumb screws 20 are loosened to disengage the inner ends of their shanks from the apertures 21 in which they have been seated, and the auxiliary platform 25 may now be moved vertically to the desired height, after which the thumb screws are manipulated to position the inner ends of the shanks thereof in a corresponding pair of the apertures 21.

Obviously the bracing member 29 must be moved vertically to retain the auxiliary platform in horizontal position and the pins 30 in the lower corners of the brace are positioned in a corresponding pair of the notches 18 and which latter, as heretofore described, are spaced apart so as to correspond with the spaced arrangement of apertures 21.

In Figure 2, solid lines show the lowermost position of the auxiliary platform and brace 29, and dotted lines show said parts in their highest adjusted positions.

When it is desired to fold the auxiliary platform and brace therefor into an out-of-the-way position in order to weigh objects in the ordinary manner upon the scale platform 11, collars 19 and the rear end of auxiliary platform 25 are elevated slightly in order to permit brace member 29 to be swung into a substantially vertical plane between the webs 17 of the upright supporting frame, after which the auxiliary platform is swung downwardly so that it occupies a vertical plane immediately in front of the supporting brace and the upright supporting frame comprising the parts 12, 13 and 14. (See Fig. 3.)

In weighing a large number of relatively small objects or packages on the platform of an ordinary scale, the weighman is required to repeatedly bend over the scale for each package or object that is placed upon or removed from the scale platform and this inconvenience is entirely eliminated by the use of an auxiliary vertically adjustable platform of my improved construction, for said platform can be adjusted vertically so as to occupy a horizontal plane where the packages can be conveniently handled by the weighman and without the necessity for constantly stooping or bending over. When filled or partially filled bags are placed on the scale platform, the upright frame serves as a support to prevent the bags from toppling over.

An auxiliary platform of my improved construction is comparatively simple, is capable of being easily and cheaply produced, may be readily adjusted from one horizontal plane to another, and can be readily folded so as to occupy a relatively small space while not in use.

It will be readily understood that minor changes in the size, form and construction of the various parts of my improved platform can be made and substituted for those herein shown and described, without departing from the spirit of my invention, the scope of which is set forth in the appended claims.

I claim as my invention:

1. The combination with a scale and its platform, of a supporting frame projecting upwardly from the scale platform, a hinged auxiliary platform arranged on said supporting frame and vertically adjustable thereon, and means carried by said auxiliary platform and adapted to engage said supporting frame for securing said auxiliary frame to the upright platform in its adjusted position.

2. A device of the class described comprising an upright frame adapted to be applied to a scale platform, an auxiliary platform, supports vertically adjustable upon said upright frame and hinged to said auxiliary platform, and a brace arranged between the upright frame and said auxiliary platform, and adapted to be moved out of engagement with said auxiliary platform to permit the latter to be folded against said frame.

3. A device of the class described comprising an upright supporting frame adapted to be applied to a scale platform, an auxiliary platform, supports vertically adjustable on said supporting frame and hingedly supporting said auxiliary platform, and means for securing said supports to said frame in their adjusted positions.

4. In a device of the class described, an upright frame adapted to be applied to a scale platform, supports adjustably arranged on said upright frame, manually operable means on said supports adapted to engage said frame and lock said supports in their adjusted positions, and auxiliary platform hinged at one end to said suppoprts, and detachable means for engaging and supporting the opposite end of said auxiliary platform.

5. In a device of the class described, an upright frame adapted to be applied to a scale platform, supports slidably arranged upon said upright frame, means in said supports for locking the latter to said frame, an auxiliary platform hinged at one end to said supports, and a brace adjustably arranged on said upright frame and detachably engaging and supporting the opposite end of said auxiliary platform.

6. In a device of the class described, an upright frame adapted to be applied to a scale platform, supports adjustably mounted on said frame, means for locking said supports in their adjusted positions, an auxiliary platform pivotally supported at one end of said supports, and a brace supported by said frame and extending upwardly and detachably engaging and supporting the opposite or outer end of said platform, whereby when said brace is disengaged from said auxiliary platform, the latter may be folded against said upright frame.

In testimony whereof I hereunto affix my signature this 9th day of September, 1920.

HARRY C. SCHAPER.